United States Patent
Garoon et al.

(10) Patent No.: US 11,408,758 B2
(45) Date of Patent: Aug. 9, 2022

(54) MACHINE LEARNING SERVER-SIDE FLOW MEASUREMENT

(71) Applicant: FlowCommand Inc., Houston, TX (US)

(72) Inventors: Jeffrey Garoon, Houston, TX (US); David Jed Somers, San Francisco, CA (US)

(73) Assignee: FlowCommand Inc., Houston, TX (US)

( * ) Notice: Subject to any disclaimer, the term of this patent is extended or adjusted under 35 U.S.C. 154(b) by 302 days.

(21) Appl. No.: 16/824,320

(22) Filed: Mar. 19, 2020

(65) Prior Publication Data

US 2021/0010839 A1    Jan. 14, 2021

Related U.S. Application Data

(60) Provisional application No. 62/873,799, filed on Jul. 12, 2019.

(51) Int. Cl.
*G01F 1/667* (2022.01)
*G06N 5/04* (2006.01)
*G06N 20/00* (2019.01)

(52) U.S. Cl.
CPC ............... *G01F 1/667* (2013.01); *G06N 5/04* (2013.01); *G06N 20/00* (2019.01)

(58) Field of Classification Search
CPC ........... G01F 1/667; G01F 25/10; G06N 5/04; G06N 20/00
See application file for complete search history.

(56) References Cited

U.S. PATENT DOCUMENTS

2016/0356665 A1* 12/2016 Felemban ........... G01M 3/2807

* cited by examiner

*Primary Examiner* — Manuel A Rivera Vargas
(74) *Attorney, Agent, or Firm* — Cognition IP, P.C.; Edward Steakley

(57) ABSTRACT

Systems and methods enable predicting flow rate in a pipeline by using machine learning. Data is collected from a pipeline with an acoustic device and transmitted from the acoustic device to a server. The data is processed and, based on the processing, a reference model is selected that is most appropriate for the processed data. Features extracted from the data are input to the reference model. The reference model outputs a predicted flow rate.

20 Claims, 6 Drawing Sheets

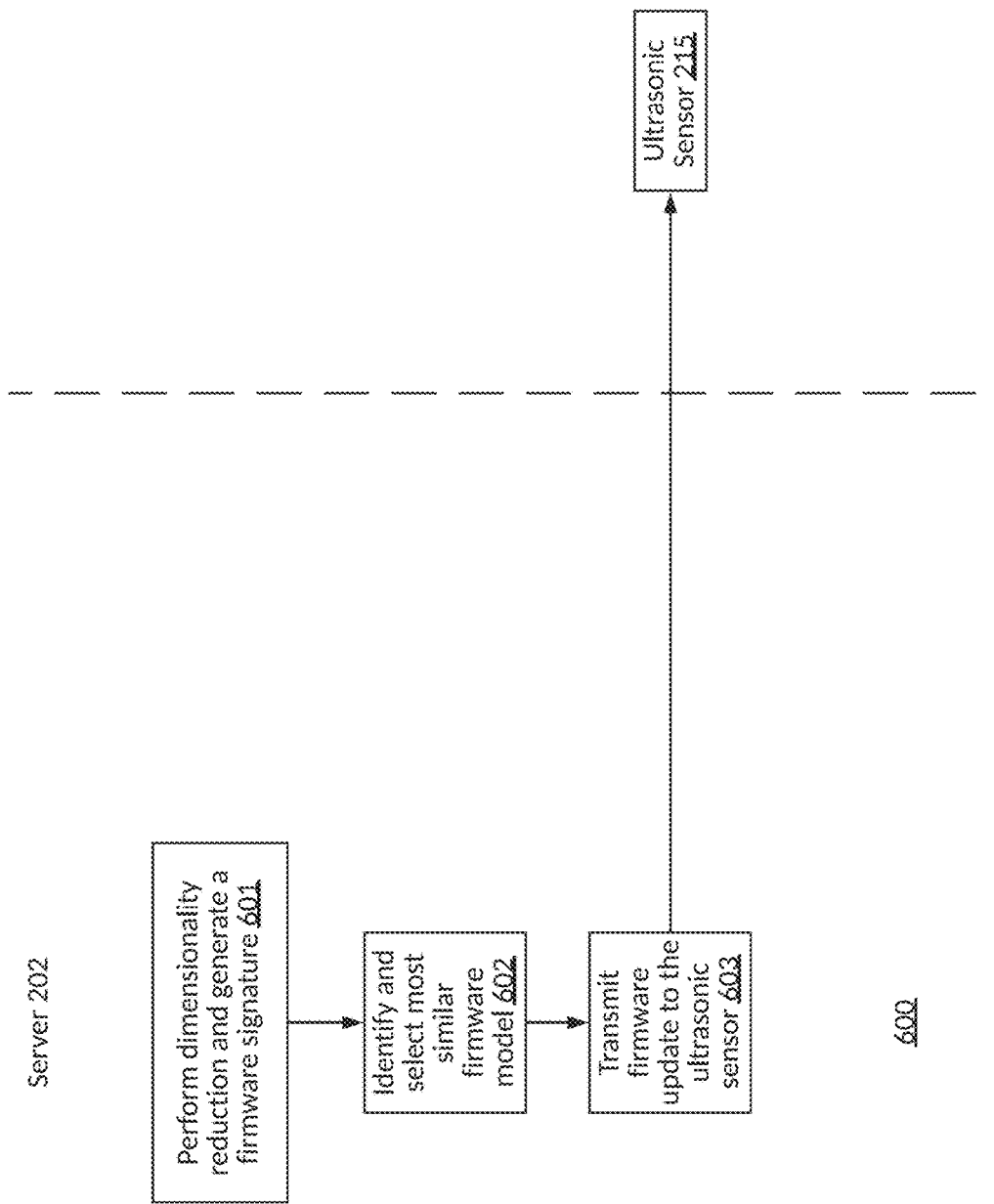

MACHINE LEARNING SERVER-SIDE FLOW MEASUREMENT

CROSS-REFERENCE TO RELATED APPLICATION

This application claims the benefit of U.S. Provisional Patent Application No. 62/873,799 filed on Jul. 12, 2019 and entitled "MACHINE LEARNING SERVER-SIDE FLOW MEASUREMENT," which is hereby incorporated by reference in its entirety.

BACKGROUND

Many industrial applications benefit from the ability to measure the flow rate of a liquid through a pipe. It is desirable in many instances to measure this flow rate from outside of the pipe such as not to disturb the flow. Acoustic flow meters provide this type of non-intrusive and non-invasive measurement by injecting acoustic waves into the pipe and measuring the reflected properties of those waves to deduce the flow rate of the liquid. These devices require on board computing power, cannot typically be adjusted remotely, and generally require manual calibration on a periodic basis. The accuracy of the devices is dependent on multiple factors that can not always be accounted for using the standard physics-based calculations used by most commercial devices.

Performing the calculations to determine flow rate on the device itself presents several disadvantages. The processing power provided on the edge device is typically only capable of performing very basic physics-based calculations and cannot handle more sophisticated algorithms that could be more accurate. Because the processor is local and the code is fixed, it cannot easily be updated remotely when new algorithms are available. There is no method for these devices to share information with other devices to improve their measurements. Most commercial devices must either be read by physical inspection or through other cumbersome connections that make it difficult to monitor from a central location.

SUMMARY

One embodiment relates to measuring the flow rate in a pipeline by using a machine learning model.

One embodiment relates to collecting data from a pipeline with an acoustic device and transmitting the data from the acoustic device to a server. The data is processed and, based on the processing, a reference model is selected that is most appropriate for the processed data. The reference model may be previously trained using training examples. Features are extracted from the data and input to the reference model. The reference model outputs a predicted flow rate.

One embodiment relates to a computer-implemented method for measuring the flow rate of a liquid or gas or multi-phase fluid flowing through a pipeline, the method comprising: transmitting, by an acoustic device, signals into an outer shell of a pipeline; receiving, by the acoustic device, received signals reflected from the contents of the pipeline; processing, by the acoustic device, the received signals to generate a data stream; transmitting, by the acoustic device, the data stream to a server; computing a flow rate based on the data stream by analyzing the wave attributes of the received signals; performing dimensionality reduction, by the server, on the data stream and one or more acoustic device attributes to generate a device signature; identifying, by the server, one of a plurality of reference models having a device signature that is most similar to the device signature of the acoustic device to select a most similar reference model; applying, by the server, a machine learning model to identify a plurality of important features from the data stream and one or more device attributes; applying a multivariate machine learning model associated with the most similar reference model, using the identified important features in the multivariate machine learning model, to predict a flow rate.

Further areas of applicability of the present disclosure will become apparent from the detailed description, the claims and the drawings. The detailed description and specific examples are intended for illustration only and are not intended to limit the scope of the disclosure.

BRIEF DESCRIPTION OF THE DRAWINGS

The present disclosure will become better understood from the detailed description and the drawings, wherein:

FIG. 6 is a flow chart illustrating an exemplary method for selecting a firmware update that may be performed in some embodiments.

DETAILED DESCRIPTION

Figure 1:
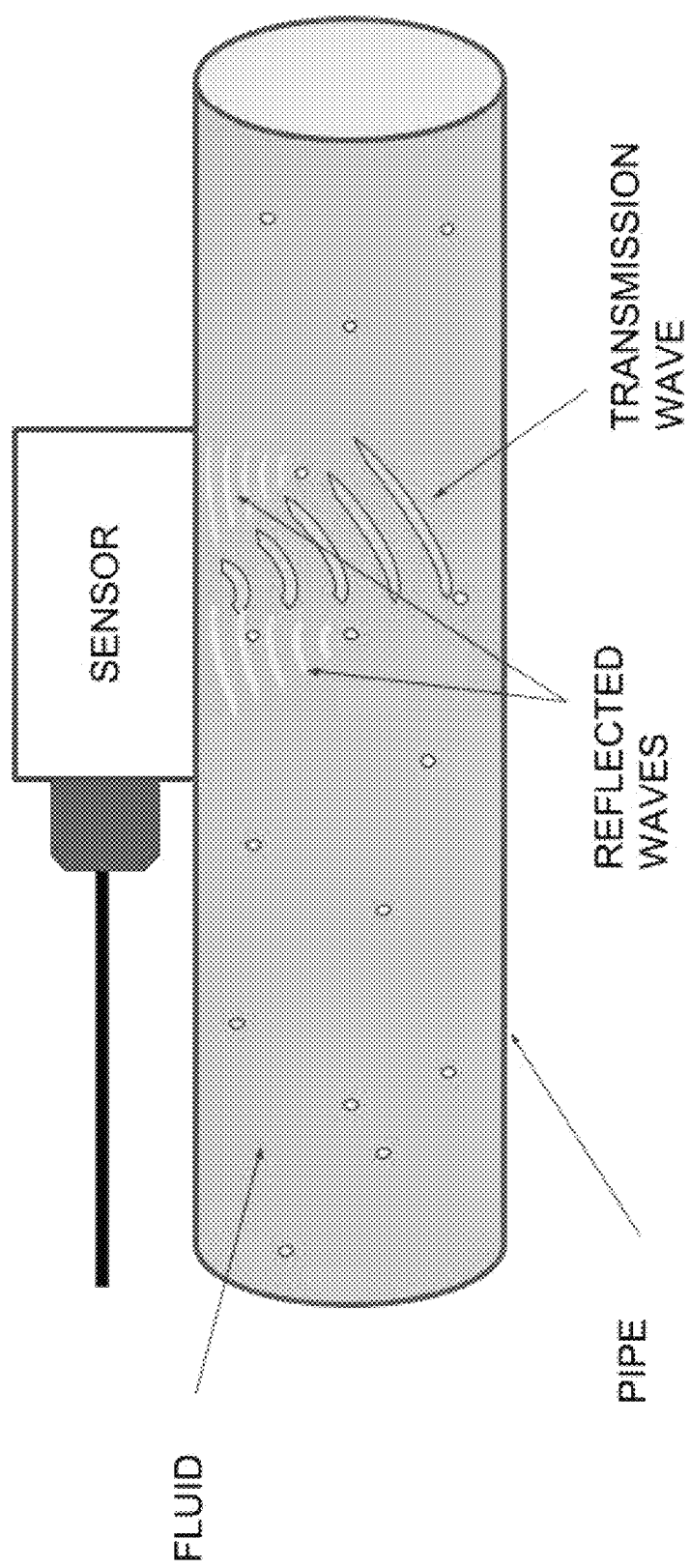
FIG. 1 is a diagram illustrating an exemplary usage of an acoustic transducer to send and receive a signal in a pipeline.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth herein can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

FIG. 1 illustrates an exemplary acoustic sensor device attached to the outside of a pipeline that transmits a signal into and through the pipeline into the fluid flowing within the pipeline. In some embodiments, the acoustic sensor device is an ultrasonic device. The signal reflects from moving particles, bubbles, or other media naturally occurring or injected into the fluid and is recorded by the sensor. The sensor signal is a time-series that can be transmitted by wire or wirelessly to a processing unit or computer that computes the wave attributes and thereby determines the flow rate (velocity) of the fluid. In some embodiments, the wave attributes that are computed and used for determining the flow rate is a Doppler Frequency.

For example, in an embodiment, a signal is injected into the outer shell of the pipeline using a piezoelectric transducer or transmitter. An equivalent receive transducer is used to capture the return reflections from the content of the pipeline. The transmitted signal may bounce off the suspended particles or bubbles inside the fluid and is then captured by the receive transducer.

If the particles are moving, then the received signal may encounter some shift in the received frequency compared to that transmitted. This change in frequency is known as Doppler shift. The amount of Doppler shift may be related to the velocity of the reflecting particles or bubbles in the pipe.

Figure 2:
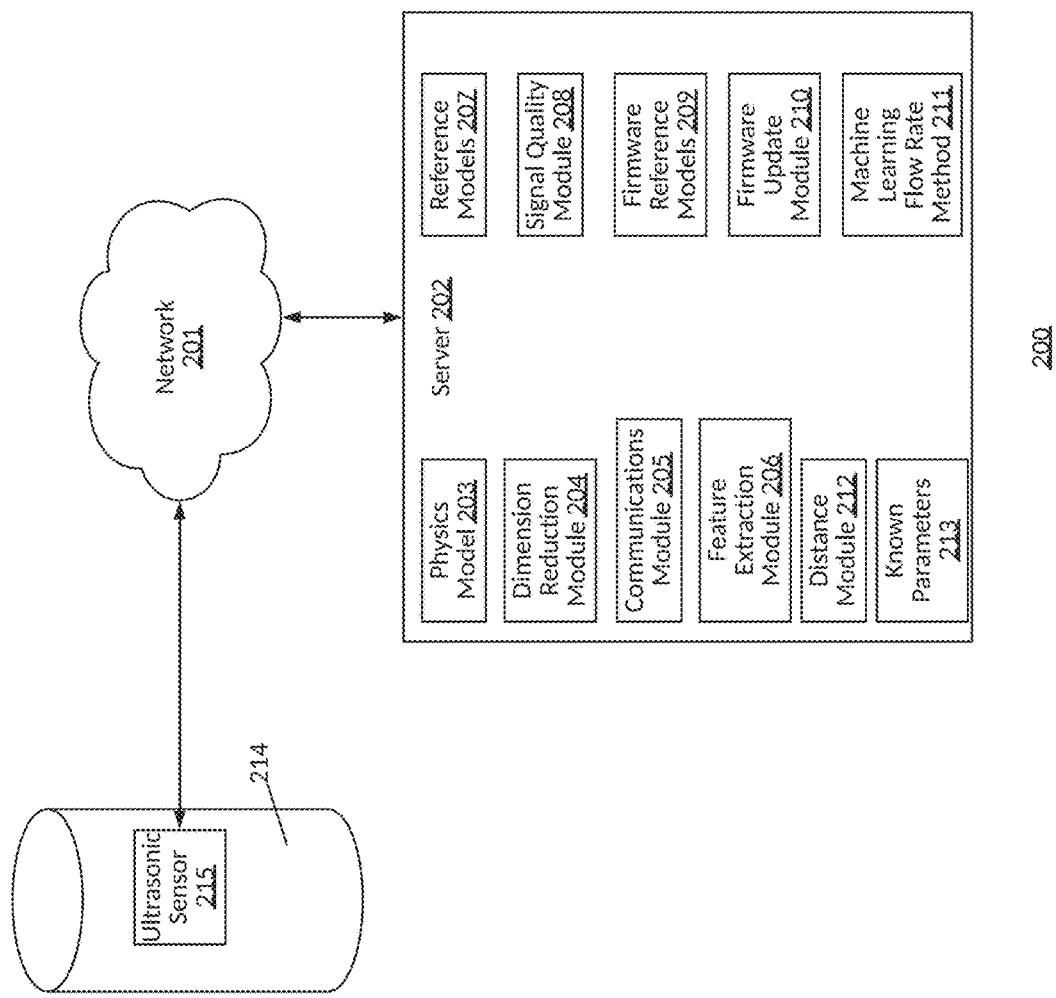
FIG. 2 is a diagram illustrating the architecture of an exemplary hardware system that may be used in some embodiments of the invention.

FIG. 2 illustrates the architecture of an exemplary hardware system 200 that may be used in some embodiments. The acoustic sensor 215 is attached to a pipeline 214 where it transmits acoustic waves into the pipeline, through the fluid, and receives the reflected waves back through a receiver 215. The time-series data captured by the acoustic sensor 215 along with other acoustic sensor attributes are transmitted via wire or wirelessly to the network 201. Acoustic sensor attributes may include items such as sampling rate, batch size, firmware settings, and other programmable or known parameters on the device. The combination of the time-series data from the sensor and the device attributes may comprise a single data stream. In other embodiments, the data stream comprises just the time-series data or just the device attributes.

The network 201 is connected by wire or wirelessly to a server 202 that processes the data stream transmitted from the network. The server 202 contains a communications module 205 that receives the data stream from the network 201 and stores it on the server 202 for processing. In another embodiment, the same communications module 205 allows for transmitting firmware updates from the firmware update module 210 back to the network 201 and on to the acoustic sensor 215.

In one embodiment, the received data stream is processed by a dimension reduction module 204 to identify a most similar reference model to apply. Dimension reduction may reduce the size of the original volume while preserving a selection of key information. Techniques for dimension reduction include principle components analysis, singular value decomposition, and random forest feature selection.

The physics model 203 calculates an estimate of the flow rate from the data stream using a physics model and other known parameters 213, which may include such items as pipe type, size, and fluid type, to interpret the frequency shift in the data and produce a flow rate value.

It may be desirable to choose the most informative features to use for input to the machine learning model. The feature extraction module 206 processes the input information, which may include the time-series data, device attributes, the dimension reduced data, the physics model 203 estimate of flow rate, and known parameters 213, into a discrete set of n features. The feature extraction module 206 derives features to be used as inputs to a machine learning model. Feature extraction is also a form of dimension reduction. Feature extraction techniques may include averaging, smoothing, combining, filtering, and sampling. In one embodiment, the machine learning flow rate method 211 may use the features output from the feature extraction module 206 to calculate a more accurate value of the flow rate using a machine learning algorithm which may include multivariate regression, decision tree, random forest, support vector machines, neural networks, and other machine learning models. The number and type of features used in the feature extraction module 206 is not limited and can be modified as needed to improve results.

The features from the feature extraction module 206 may also be used by the distance module 212 as part of a distance calculation that determines how similar the incoming sensor data is to other known sensors. In an exemplary embodiment, the distance module 212 takes inputs from the data stream, the dimension reduction module 204, the extracted features module 206, and known parameters 213, to calculate a distance metric that determines which of the stored sensor reference models 207 the acoustic sensor 215 is most similar to. The distance module 212 then produces a select signal to choose the closest model from the plurality of reference models 207 and uses that model to calculate a final flow rate.

In an embodiment, a plurality of reference models 207 may be provided on the server 202, each reference model for predicting a different aspect. The steps described above for selecting the reference model may be repeated for each of the different models for predicting each type of value. Separate reference models may be used for predicting whether the flow is on or off, to model flow for a sensor with a small amount of reference data (training data), and to model flow for a sensor with a large amount of reference data (training data).

The stored reference models 207 are obtained by training machine learning models in a controlled environment on a variety of pipe types and fluid materials where the flow rate is known or provided by a reference flow meter. These reference models 207 are not limited in number or type and may be added to or modified as new reference data is obtained. Reference models may be trained in a lab environment or in customer field applications. Each model is trained individually and each model uses its own set of input features that are selected using a decision tree. Reference models 207 may comprise multivariate regression, decision tree, random forest, support vector machines, neural networks, and other machine learning models.

The signal quality module 208 is a separate process from the machine learning flow rate method 211. The signal quality module 208 may take input from the data stream, the dimension reduced 204 data, the extracted features 206, and known parameters 213, to calculate a distance metric that determines which of the stored firmware reference models 209 the sensor 215 is most appropriate for. In some embodiments, appropriateness may be determined by similarity based on the distance metric. The inputs to the signal quality model and the distance metric may be referred to as the firmware update signature. The firmware reference models 209 are known good models with good quality and the distance is a measure of quality of the signal that can then be used to determine if the firmware should be updated in a specific way. The signal quality module 208 produces a select signal that chooses the best possible firmware model from the plurality of firmware reference models 209 to improve accuracy. The firmware update module 210 may communicate firmware updates from the server 202 to the sensor 215 via the network 201.

Figure 3:
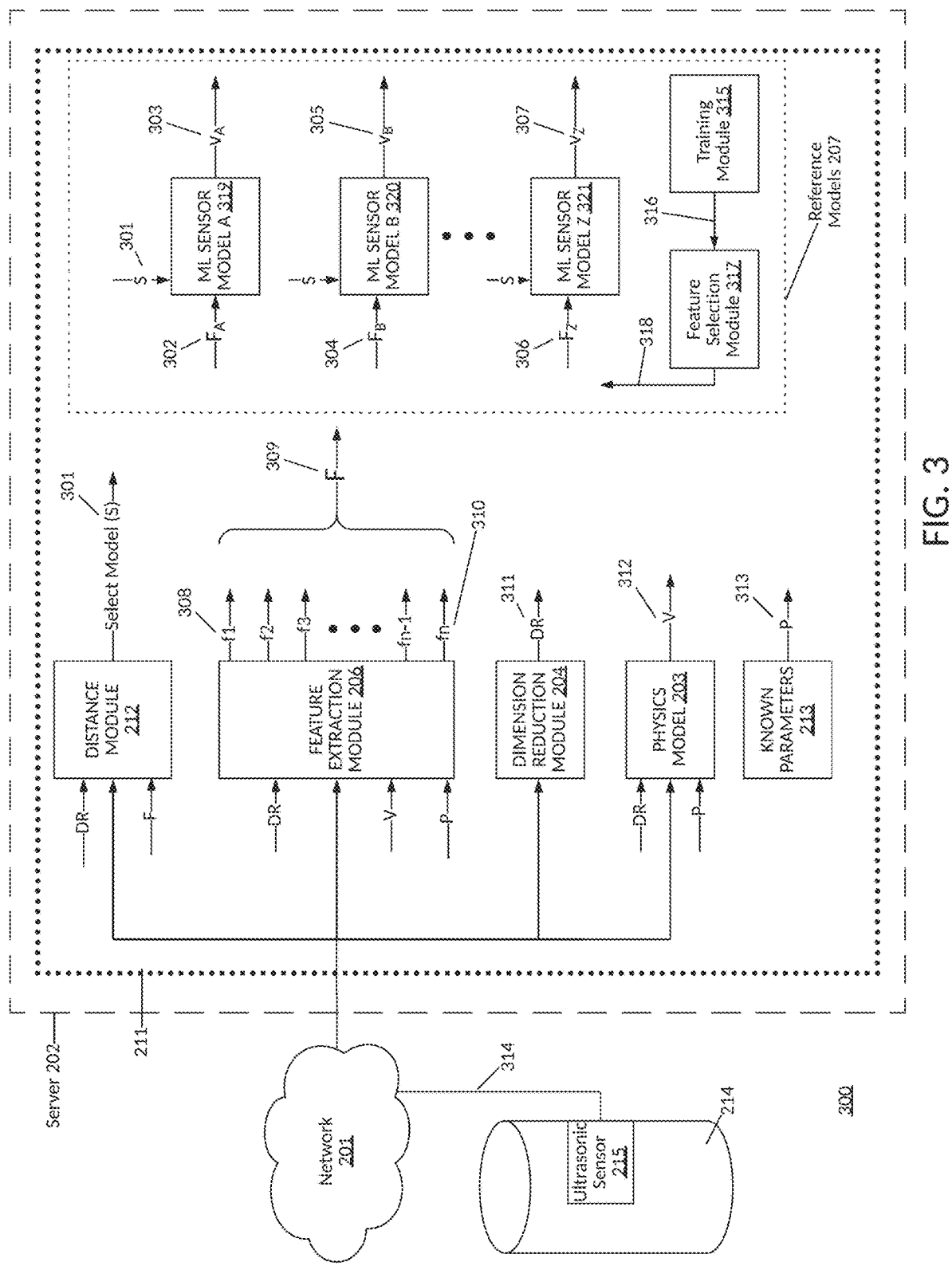
FIG. 3 is a diagram illustrating an exemplary method for flow rate estimation using machine learning that may be performed in some embodiments.

FIG. 3 illustrates an exemplary embodiment of the operations 300 on the server 202 that take the data stream 314 from the sensor 215 and network 201 to produce a prediction of the flow rate using the machine learning flow rate method 211. In one embodiment, the data stream 314 is first passed through a dimension reduction module 204 that re-packages the original data stream 314 into a reduced set of data 311. This reduced dimension version of the data 311 is then passed to the other processing blocks discussed next.

The physics model 203 receives the reduced dimension data 311 and optionally the original data stream 314 and any known parameters 313, such as pipe type, size or fluid type, and then produces an estimate of the flow rate 312 using physics-based calculations.

The feature extraction module 206 takes as input the raw data stream 314, the reduced dimension data 311, the physics flow rate estimate 312 and the known parameters 313, and produces an output vector of features 309. The individual feature components of the vector 309 are shown from the first feature 308 to the nth feature 310.

The distance module 212 takes inputs from the original time series 314, the reduced dimension data 311, and the feature vector 309 to calculate a distance metric relative to the known reference models 207. The distance module 212 then produces a select signal 301, which will select from the plurality of known reference models 207, the sensor model that most closely matches the sensor 215 being measured. The select signal may comprise a device signature that indicates key indicators of the time series and device attributes that allow selection of a similar reference model. The flow rate is then obtained from the selected model. For instance, if model sensor 320 was chosen, the flow rate 305 is the output.

Each individual sensor model, for example 319, 320, 321, from the plurality of reference models 207, has been individually trained on specific known pipe parameters and known flow rates to create a machine learning model for that type of pipe and fluid. The subset of input features to the individual sensor models 302, 304, 306 are selected for each model using a machine learning model in the feature selection module 317 that selects the most important features for that particular model from the complete vector of features 309 during training of each individual model performed by the training module 315. In one embodiment, the machine learning model in feature selection module 317 is a decision tree, K-nearest neighbors algorithm, or other machine learning model. The sensor model 319, for example, is trained by the training module 315, which produces the trained model and a ranking of the most important features 316. The feature selection module 317 then uses the machine learning model to select the best subset of features 318 for that particular model. In this example, the output at 318 would be the input features 302 for the sensor model 319. The number and types of reference sensor models 207 is not limited in any way. References models 207 are illustrated with 26 models A through Z, however there could be many more models and it is in fact assumed that the model numbers would grow as more types of pipes, fluids, and sensors are characterized and added to the known reference models 207.

In some embodiments, feature selection module 317 is a machine learning module that is applied to the output of the dimension reduction module 311, select signal 301, data stream 314, or device attributes in order to select features based on the dynamic data at runtime, rather than solely based on reference models 207.

Figure 4:
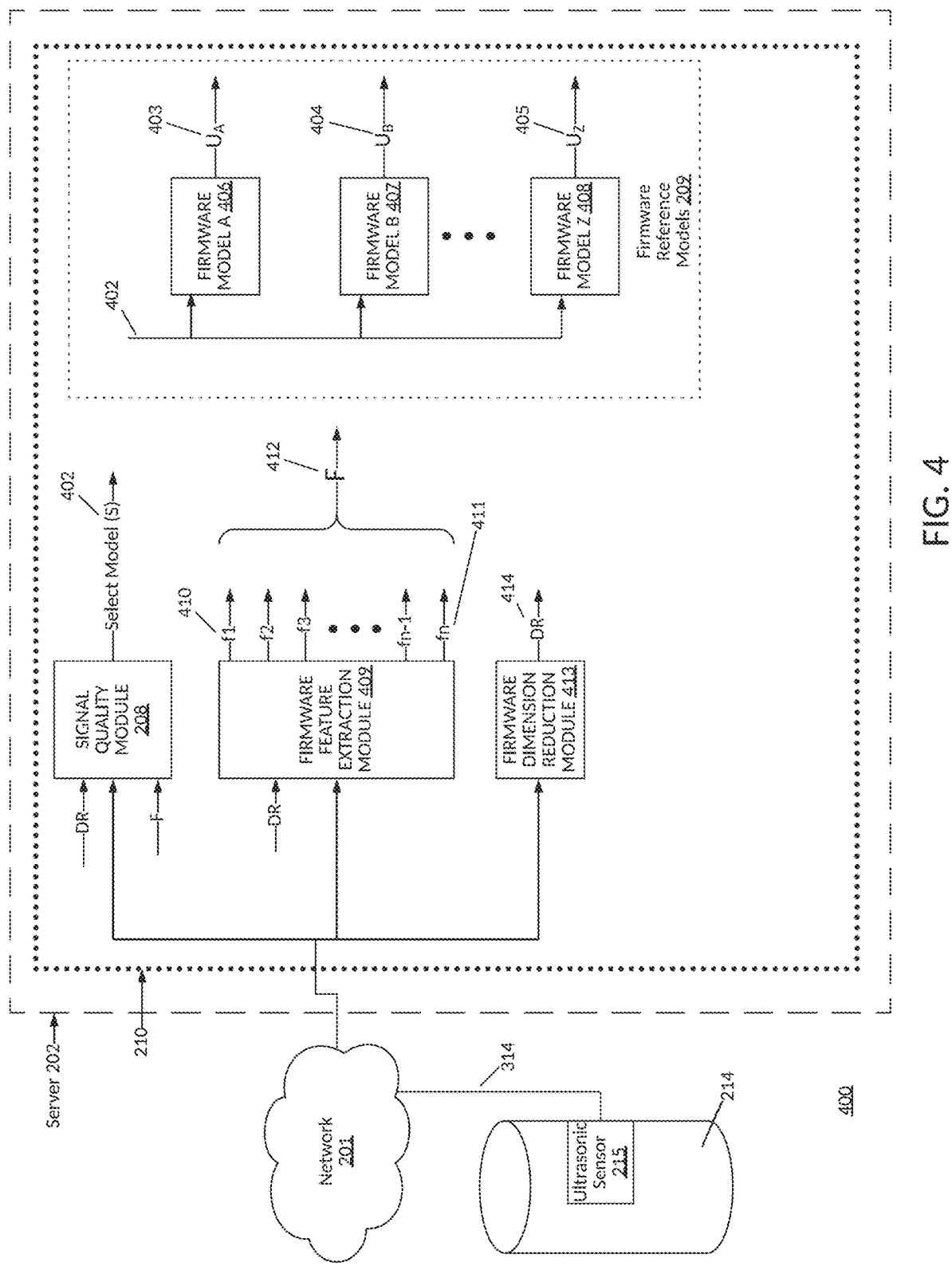
FIG. 4 is a diagram illustrating an exemplary method for determining a firmware update that may be performed in some embodiments.

It is desirable in practice to be able to improve the accuracy of the flow rate measurement as new data is received from the device. In an embodiment, the sensor 215 may have an onboard processor or remote processor that executes programmable firmware to adjust and optimize the performance and quality of the sensor measurement. FIG. 4 illustrates an exemplary embodiment of the operations 400 on the server 202 that take the data stream 314 from the sensor 215 and network 201 to implement the firmware update module 210. In one embodiment, the time-series data stream 314 is first passed through a firmware dimension reduction module 413 which re-packages the original time-series 314 into a reduced set of data 414. This reduced dimension version of the data 414 is then passed to the other processing blocks discussed next.

The firmware feature extraction module 409 takes as input the raw data stream 314 and the reduced dimension data 414 and produces an output vector of features 412. The individual feature components of the vector 412 are shown from the first feature 410 to the nth feature 411. The signal quality module 208 takes input from the firmware dimension reduction module 413, the raw time-series data 314, and the firmware feature extraction module 409. The signal quality module 208 then produces a select signal 402 which will select, from the plurality of known firmware reference models 209, the firmware model that will best improve the accuracy of the sensor 215 being measured. The select signal 402 may comprise a firmware update signature that indicates key indicators of the time series and device attributes that allow selection of a similar firmware reference model. An exemplary firmware model may be composed of firmware which contains a number of programmable parameters and instructions that have been optimized for high signal quality in relation to a particular sensor model from the set of reference models 207. The appropriate firmware update is then obtained from the selected firmware model and sent via the network 201 back to the sensor 215. For instance, if firmware model 407 was chosen, then the firmware update 404 will be sent via the network 201 back to the sensor 215. The model select signal 402 is chosen based on a distance metric that measures the similarity of the data coming from the sensor 215 to the known firmware reference models 209. The firmware reference models 209 are obtained from known good firmware settings from known sensor reference models 207 through lab testing and field measurements. The firmware reference models 209 are stored on the server 202 and may be added to or improved as new data is obtained. In an embodiment, the firmware update is performed once at the start of a set of measurements. In another embodiment, the firmware update is performed periodically or based on other information that may be sent by the device or other monitoring mechanism. The firmware reference models 209 are illustrated with 26 models A through Z, however there could be many more models and it is in fact assumed that the model numbers would grow as more types of pipes, fluids, and sensors are characterized and added.

Figure 5:
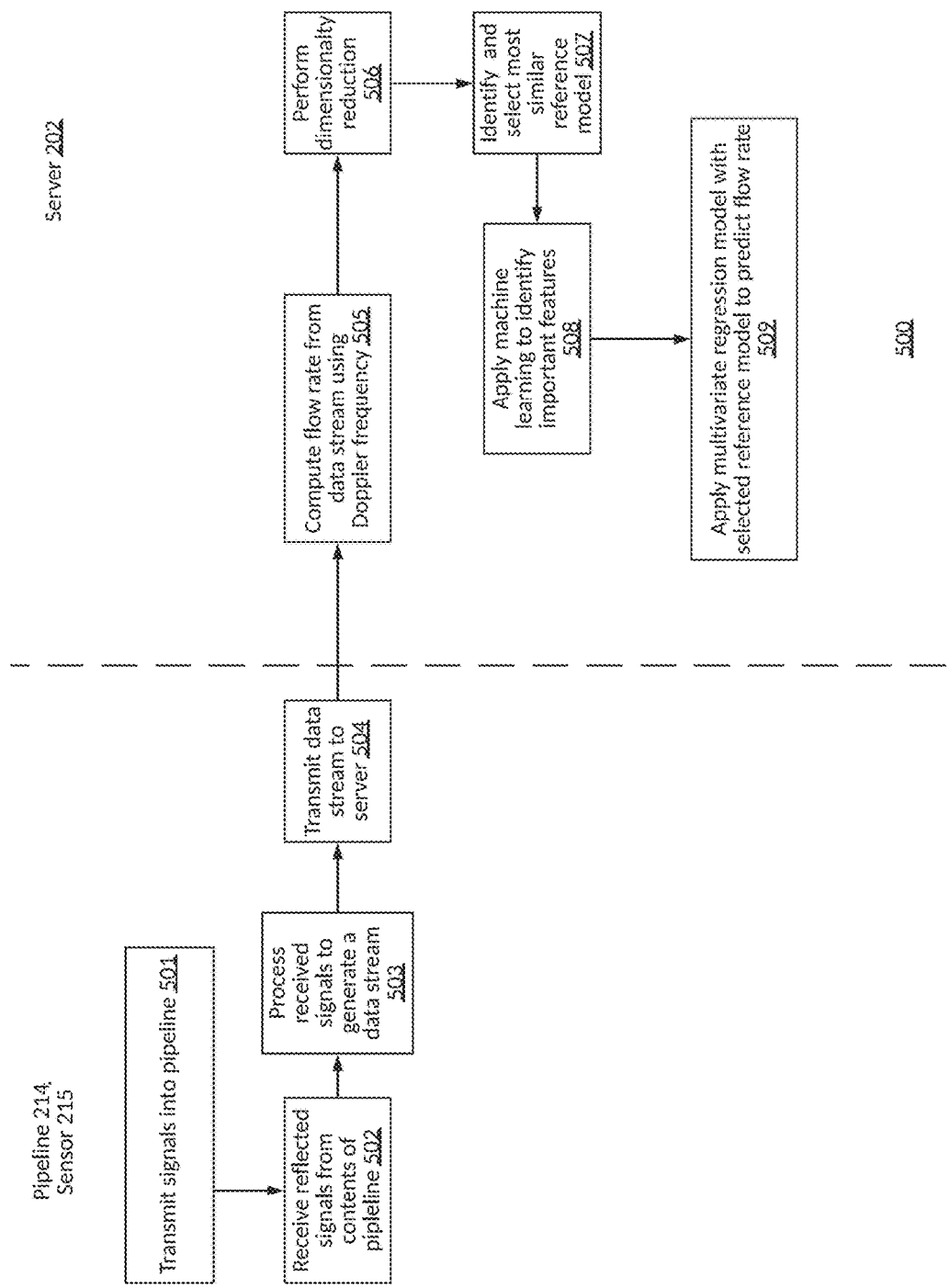
FIG. 5 is a flow chart illustrating an exemplary method for flow rate estimation that may be performed in some embodiments.

FIG. 5 illustrates an exemplary method 500 for predicting flow rate using machine learning. In step 501, an acoustic sensor transmits signals into an outer shell of pipeline 214.

In step 502, the acoustic sensor 215 receives reflected signals from the contents of pipeline 214. In step 503, the acoustic sensor 215 processes the received signals to generate a data stream. In step 504, the acoustic sensor 215 transmits the data stream to server 202. In step 505, the server 202 computes the flow rate from the data stream using Doppler frequency 505, such as by using physics model 203. In step 506, the server 202 performs dimensionality reduction on the data stream and one or more acoustic device attributes to generate a device signature. In step 507, the server 202 identifies one of a plurality of reference models having a device signature that is most similar to the device signature of the acoustic device to select a most similar reference model. In step 508, the server 202 applies a machine learning model to identify a plurality of important features from the data stream and one or more device attributes. In step 509, the server applies a multivariate machine learning model associated with the most similar reference model, using the identified important features in the multivariate machine learning model, to predict a flow rate. The machine learning model may be, for example, a neural network, decision tree, random forest, regression, support vector machine, Bayesian network, or other machine learning models.

FIG. 6 illustrates an exemplary method 600 for performing a firmware update. In step 601, the server 202 performs dimensionality reduction on the data stream and one or more indicators of a firmware update installed on the acoustic device 215 to generate a firmware update signature. In step 602, the server 202 identifies and selects one of a plurality of firmware models having a firmware update signature that is most similar to the firmware update signature of the acoustic device 215. In step 603, the server 202 transmits a firmware update associated with the firmware model to the acoustic device 215.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

In general, the terms "engine" and "module", as used herein, refer to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on one or more computer readable media, such as a compact discs, digital video discs, flash drives, or any other tangible media. Such software code may be stored, partially or fully, on a memory device of the executing computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A computer-implemented method for measuring the flow rate of a fluid or gas or multi-phase flow flowing through a pipeline, the method comprising:
   transmitting, by an acoustic device, signals into an outer shell of a pipeline;
   receiving, by the acoustic device, received signals reflected from the contents of the pipeline;
   processing, by the acoustic device, the received signals to generate a data stream;
   transmitting, by the acoustic device, the data stream to a server; computing a flow rate based on the data stream by analyzing a Doppler frequency of the received signals;
   performing dimensionality reduction, by the server, on the data stream and one or more acoustic device attributes to generate a device signature;
   identifying, by the server, one of a plurality of reference models having a device signature that is most similar to the device signature of the acoustic device to select a most similar reference model;
   applying, by the server, an attribute identification machine learning model to identify a plurality of important features from the data stream and one or more device attributes; and
   applying a multivariate machine learning model associated with the most similar reference model, using the identified important features in the multivariate machine learning model, to predict a flow rate.

2. The method of claim 1, wherein each of the plurality of reference models comprises an associated multivariate machine learning model.

3. The method of claim 1, wherein the attribute identification machine learning model is a nearest neighbors algorithm.

4. The method of claim 1, further comprising selecting the most similar reference model by using a distance metric.

5. The method of claim 1, further comprising applying a feature extraction module to the data stream.

6. The method of claim 1, further comprising modeling the flow rate by using a physics model.

7. The method of claim 1, further comprising training the attribute identification machine learning model using parameters from one or more of the reference models.

8. The method of claim 1, further comprising:
   performing dimensionality reduction, by the server, on the data stream and one or more indicators of a firmware update installed on the acoustic device to generate a firmware update signature;
   identifying, by the server, one of a plurality of firmware models having a firmware update signature that is most similar to the firmware update signature of the acoustic device to select a most similar firmware model; and
   transmitting a firmware update associated with the firmware model to the acoustic device.

9. The method of claim 8, further comprising selecting the most similar firmware model by using a distance metric.

10. The method of claim 8, further comprising measuring, by the acoustic device, the flow rate in the pipeline using updated firmware settings.

11. A non-transitory computer-readable medium comprising instructions for:
   transmitting, by an acoustic device, signals into an outer shell of a pipeline;
   receiving, by the acoustic device, received signals reflected from the contents of the pipeline; processing, by the acoustic device, the received signals to generate a data stream;
   transmitting, by the acoustic device, the data stream to a server;
   computing a flow rate based on the data stream by analyzing a Doppler frequency of the received signals;
   performing dimensionality reduction, by the server, on the data stream and one or more acoustic device attributes to generate a device signature;
   identifying, by the server, one of a plurality of reference models having a device signature that is most similar to the device signature of the acoustic device to select a most similar reference model;
   applying, by the server, an attribute identification machine learning model to identify a plurality of important features from the data stream and one or more device attributes; and
   applying a multivariate machine learning model associated with the most similar reference model, using the identified important features in the multivariate machine learning model, to predict a flow rate.

12. The non-transitory computer-readable medium of claim 11, wherein each of the plurality of reference models comprises an associated multivariate machine learning model.

13. The non-transitory computer-readable medium of claim 11, wherein the attribute identification machine learning model is a nearest neighbors algorithm.

14. The non-transitory computer-readable medium of claim 11, further comprising instructions for selecting the most similar reference model by using a distance metric.

15. The non-transitory computer-readable medium of claim 11, further comprising instructions for applying a feature extraction module to the data stream.

16. The non-transitory computer-readable medium of claim 11, further comprising instructions for modeling the flow rate by using a physics model.

17. The non-transitory computer-readable medium of claim 11, further comprising instructions for training the machine learning model using parameters from one or more of the reference models.

18. The non-transitory computer-readable medium of claim 11, further comprising instructions for:
   performing dimensionality reduction, by the server, on the data stream and one or more indicators of a firmware update installed on the acoustic device to generate a firmware update signature;
   identifying, by the server, one of a plurality of firmware models having a firmware update signature that is most similar to the firmware update signature of the acoustic device to select a most similar firmware model; and
   transmitting a firmware update associated with the firmware model to the acoustic device.

19. The non-transitory computer-readable medium of claim 18, further comprising instructions for selecting the most similar firmware model by using a distance metric.

20. The non-transitory computer-readable medium of claim 18, further comprising instructions for measuring, by the acoustic device, the flow rate in the pipeline using updated firmware settings.

* * * * *